(12) United States Patent
Wolf

(10) Patent No.: US 6,233,328 B1
(45) Date of Patent: May 15, 2001

(54) DOOR INTERCOM

(76) Inventor: Michael Wolf, Sichererestrasse 9, D-74076 Heibronn (DE)

( * ) Notice: Subject to any disclaimer, the term of this patent is extended or adjusted under 35 U.S.C. 154(b) by 0 days.

(21) Appl. No.: 08/930,841
(22) PCT Filed: Apr. 1, 1996
(86) PCT No.: PCT/DE96/00565
§ 371 Date: Dec. 22, 1997
§ 102(e) Date: Dec. 22, 1997
(87) PCT Pub. No.: WO96/31045
PCT Pub. Date: Oct. 3, 1996

(30) Foreign Application Priority Data

Mar. 30, 1995 (DE) .............................. 195 11 622

(51) Int. Cl.$^7$ .............................. H04M 1/64; H04M 1/24; H04M 1/00
(52) U.S. Cl. .................. 379/159; 379/34; 379/88.01; 379/160; 379/167
(58) Field of Search .............................. 379/88.1, 69, 70, 379/85, 67.1, 88.01, 88.18, 159, 160, 167, 168, 171, 184, 37, 34, 102.06, 215, 245; 340/542, 425.5, 426, 506, 543

(56) References Cited

U.S. PATENT DOCUMENTS 4,006,459 * 2/1977 Baker et al. .......................... 340/149
4,338,493 * 7/1982 Stenhuis et al. ........................ 379/70
4,715,060 * 12/1987 Lipscher et al. ....................... 379/70

(List continued on next page.)

FOREIGN PATENT DOCUMENTS 23 32 244 C2    4/1984  (DE).
20 05 745 C3    6/1984  (DE).
34 00 157 A1    7/1985  (DE).
37 28 479 A1    3/1989  (DE).

(List continued on next page.)

OTHER PUBLICATIONS

Falke, Herbert. "Das Familien–Telefon der Post." *Funkschau*, 2, 1982, pp. 58–59.

ETA–2006 ETS2006 FAX Bedienhandbuch zu den Elektronischen Telefon–Systemen, Auerswald GmbH & Co. KG undated brochure.

*Primary Examiner*—Fan Tsang
*Assistant Examiner*—Allan Hoosain
(74) *Attorney, Agent, or Firm*—Boyle Fredrickson Newholm Stein & Gratz S.C.

(57) ABSTRACT

An automatic door answering system comprises a door intercom system, a recording machine, a telecommunication system, first, second and third interfaces, and a microprocessor-based switching device. The switching device is coupled to the door intercom system, the recording machine, and the telecommunication system by way of the first, second, and third interfaces, respectively. The switching device switches back and forth between coupling the door intercom system to a telecommunication system, coupling the door intercom system to a recording machine, and coupling the telecommunication system to the recording machine. If the recipient of a visitor is not available, the automatic door answering system establishes a communication link between the visitor and the recipient using the door intercom system and the telecommunication system. If the recipient of the visitor is not available, the automatic door answering system allows the visitor to record a message for the recipient. The message may be time-stamped to provide additional information. The recording system may also be used to play messages to the visitor and to request information from the visitor, such as the identity of the recipient. The automatic door answering system may then use the identity of the recipient to determine how to establish a telephone connection with the recipient.

8 Claims, 1 Drawing Sheet

U.S. PATENT DOCUMENTS

| | | | |
|---|---|---|---|
| 4,764,953 | | 8/1988 | Chern et al. ........................ 379/355 |
| 4,827,518 | * | 5/1989 | Feustel et al. ........................ 381/42 |
| 5,148,468 | * | 9/1992 | Marrick et al. ........................ 379/56 |
| 5,303,300 | * | 4/1994 | Eckstein ........................ 379/103 |
| 5,363,425 | * | 11/1994 | Mufti et al. ........................ 379/38 |
| 5,428,388 | * | 6/1995 | Von Bauer et al. ........................ 348/155 |
| 5,475,377 | * | 12/1995 | Lee ........................ 340/825.34 |
| 5,483,577 | * | 1/1996 | Gulick ........................ 379/67 |
| 5,565,857 | * | 10/1996 | Lee ........................ 340/825.34 |
| 5,657,380 | * | 8/1997 | Mozer ........................ 379/88.01 |

FOREIGN PATENT DOCUMENTS

| | | |
|---|---|---|
| 38 20 112 C2 | 3/1990 | (DE). |
| 41 27 316 C1 | 6/1992 | (DE). |
| 92 13 688 U | 3/1993 | (DE). |
| 41 36 138 A1 | 5/1993 | (DE). |
| 94 00 122 U | 4/1994 | (DE). |
| 42 36 565 A1 | 5/1994 | (DE). |
| 43 02 164 A1 | 7/1994 | (DE). |
| 44 20 299 A1 | 11/1994 | (DE). |
| WO 94/23522 | 10/1994 | (WO). |
| WO 95/08891 | 3/1995 | (WO). |

* cited by examiner

DOOR INTERCOM

BACKGROUND OF THE INVENTION

1. Field of the Invention

The invention relates to an automatic door answering system in accordance with the type stated in the main claim.

2. Description of the Related Art

Door intercom circuits already exist which operate in conjunction with a telephone installation. With such systems a button is pressed on the telephone apparatus, enabling the door intercom system to be monitored. In this case, the telephone apparatus, which can also be used for long distance calls or internal calls on an in-house system, replaces the call station of the door intercom system installed in the building. Because such systems lack the necessary logistics, they do not enable a check to be made on callers at the door, or for such calls to be monitored or recorded.

SUMMARY OF THE INVENTION

The present invention overcomes these drawbacks of the prior art. Specifically, an automatic door answering system according to the present invention advantageously takes the form of a compact module that can switch between a door intercom system, a recording device and a telecommunications system, has separate interfaces with the door intercom system, recording device and telecommunications system, and uses a microprocessor-assisted control system to achieve active selection between the interfaces. The door intercom may have an umber of call buttons, allocated to various different stations such as telephone connections. In particular, the switching device switches connection of the door intercom system between the recording machine and the telecommunication system. Operating the call button on the door intercom automatically activates the door answering system, dialing the appropriate connection. At the same time a message is played to the person using the answering system. The recipient can then take the call and speak with the caller. If the recipient does not deal with the call personally, the door answering system will activate the recording device, enabling the caller to leave a message. However, all calls at the door are registered, together with the time of the call, enabling calls to be monitored. The recording device can be accessed by telephone. The door answering system is suitable for both commercial and private use. Typical applications include companies, office buildings staffed by a doorman, emergency services and hotels.

A further advantage of this invention consists of the fact that the door answering system does not require any drive mechanism or mechanical parts. Because it is electronically operated, it is not subject to wear. Furthermore, the door answering system is extremely compact.

Another benefit of the entry management system is that it can be easily programmed without the need for ancillary equipment.

The following description, drawing, and claims also indicate some of the other advantages of this invention and of its developments.

BRIEF DESCRIPTION OF THE DRAWING

The drawing shows an embodiment of the subject of this invention, described in greater detail below. It shows the following:

DETAILED DESCRIPTION OF THE PREFERRED EMBODIMENT

Figure 1:
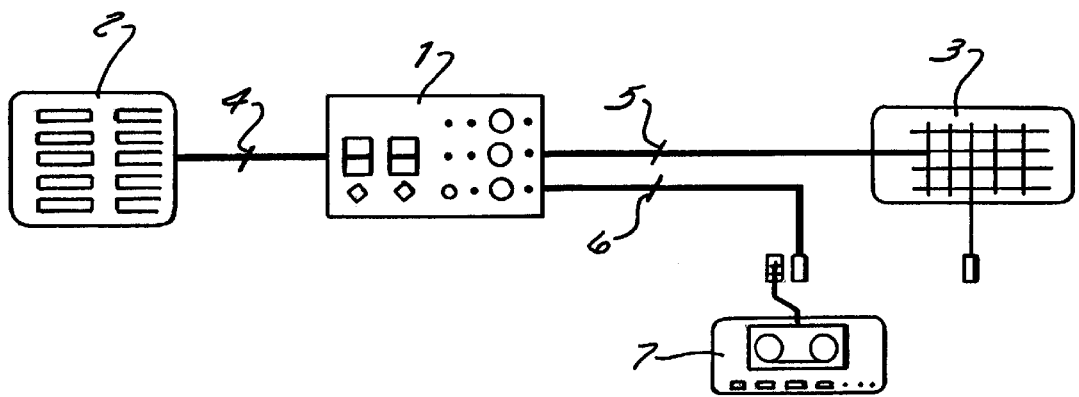
FIG. 1 shows a block diagram of an installation with door answering system, door intercom, recording device, and telephone installation.

FIG. 1 shows a block diagram of a door answering system that includes a door answering unit 1. The door answering unit 1 is connected between the intercom 2 and telephone installation 3. The interfaces 4 and 5 at the door answering unit 1 are provided for this purpose. The answering machine 7 is connected via another interface 6. As shown in FIG. 1, the door answering unit 1, the intercom 2, the telephone installation 3 and the answering machine 7 are physically separate units, with the intercom 2, the telephone installation 3 and the answering machine 7 being connected to the door answering unit by way of the respective interfaces 4, 5 and 6, respectively. The door answering unit 1 is supplied with electricity via the door intercom 2.

Interface 4 is a multicore (5+n), while 5 and 6 are two-wire interfaces:

Interface multicore (5+n)

Interface 5 two-wire loop (as for terminal/telephone set) for calling target subscriber, spoken announcement, call interface for remote answering, a/b transfer, programming input Interface 6 two-wire connection (as for exchange/extension connection) with two-way calling, for recordings made by the central recording device when several connections are provided, programming input.

When the call button on the door intercom system 2 is pressed, the door answering unit 1 recognizes the AC signal, initially stores the information, and immediately dials the appropriate connection. At the same time it plays a message to the caller, for example, "one moment please". If the line is clear, the connection is established with the door intercom. The caller then hears the call tone. If the call is not answered, the answering machine is activated by means of an interface. The caller then hears a message, for example, "That line is unavailable. You may, however, leave a message on our central information system. Please speak now." The information that is then recorded and details of the unsuccessful connection are stored. The person being called can listen to the information stored on the answering machine, either directly or using the remote calling mode.

If the person who is being called is initially unable to take the call, for example, if he or she is not present, the door answering unit 1 will nevertheless continue to dial the number.

Being in the form of a compact module, the door answering unit 1 is suitable for connection to most commercial door intercom systems, recording devices and telecommunications systems without requiring any modification or special devices. The telecommunications systems may consist of in-house equipment or systems connected to the public telephone network. In the latter case, the door answering unit 1 can also call up external telephone connections via the telecommunications system, thereby providing a wider range of applications. Recordings can be made on standard answering machines or voice message storage systems such as ACD (Automatic Call Distribution) systems. Furthermore, the door answering unit 1 can be equipped with speech recognition, capable of using the spoken text in order to identify who is being called, to enable the correct connection to be made. In this case, the door answering unit 1 need only be provided with one, or very few buttons because, with the aid of the speech recognition system, the person being called can be located using spoken text instead of pressing the button assigned to that person. The dialog conducted using the door intercom is controlled by means of the door answering unit 1.

The door answering unit 1 can also include a printer interface. By connecting a printer, it is then possible to print out important data. Usually the entry control system (known as the "Türbutler") is supplied with electricity through the door intercom system, but an external power pack may be used in certain cases.

The entry management system can be easily programmed without the need for ancillary equipment. This is achieved by entering an appropriate code at one of the telecommunication system's stations. Any of the following settings can be made: the telephone connections assigned to the respective door intercom buttons, the message to be played to callers, the intervals between messages, the period that elapses before the recorder begins functioning, date and time, or personal information.

The door answering unit 1 can also be connected to a telecommunications system with several stations or telephone connections. In such cases, only one central recording device is needed, although several may be used if required.

Many other changes and modifications may be made to the present invention without departing from the spirit thereof. The scope of these and other changes will become apparent from the appended claims.

Door Answering System

State of Art

The invention is based on an automatic door answering system in accordance with the type stated in the main claim.

Door intercom circuits already exist, operating operate in conjunction with a telephone installation. With such systems a button is pressed on the telephone apparatus, enabling the door intercom system to be monitored. In this case the telephone apparatus, which can also be used for long distance calls or internals calls on an in-house system, replaces the call station of the door intercom system installed in the building. Because such systems lack the necessary logistics, they do not enable a check to be made on callers at the door, or for such calls to be monitored or recorded.

The Invention and Its Advantages

Unlike previous systems, the advantage of the automatic door answering system as represented by this invention is that it takes the form of a compact module that can switch between the door intercom system, the recording device and telecommunications system, has separate interfaces with the door intercom system, recording device and telecommunications system, and uses a microprocessor-assisted control system to achieve active selection between the interfaces. The door intercom may have an umber of call buttons, allocated to various different stations such as telephone connections. Operating the call button on the door intercom automatically activates the door answering system, dialing the appropriate connection. At the same time a message is played to the person using the answering system. The recipient can then take the call and speak with the caller. If the recipient does not deal with the call personally, the door answering system will activate the the recording device, enabling the caller to leave a message. However, in all calls at the door will be registered, together with the time of the call, enabling calls to be monitored. The recording device can be accessed by telephone. The door answering system is suitable for both commercial and private use. Typical applications include companies, office buildings staffed by a doorman, emergency services and hotels.

Being in the form of a compact module, the door answering system suitable for connection to most commercial door intercom systems, recording devices and telecommunications systems without requiring any modification or special devices. The telecommunications systems may consist of in-house equipment or systems connected to the public telephone network. In the latter case the door answering system can also call up external telephone connections via the telecommunications system, thereby providing a wider range of applications. Recordings can be made on standard answering machines or voice message storage systems such as ACD (Automatic Call Distribution) systems. Furthermore the door answering system can be equipped with speech recognition, capable of using the spoken text in order to identify who is being called, to enable the correct connection to be made. In this case the door answering system need only be provided with one, or very few buttons because, with the aid of the speech recognition system, the person being called can be located using spoken text instead of pressing the button assigned to that person. The dialog conducted using the door intercom is controlled by means of the door answering system.

The door answering system can also include a printer interface. By connecting up a printer it is then possible to print out important data. Usually the entry control system (known as the "Tübutler") is supplied with electricity through the door intercom system, but an external power pack may be used in certain cases.

A further advantage of this invention consists of the fact that the door answering system does not require any drive mechanism or mechanical parts. Because it is electronically operated it is not subject to wear. Furthermore the door answering system is extremely compact. Another benefit of the entry management system is that it can be easily programmed without the need for ancillary equipment. This is achieved by entering an appropriate code at one of the telecommunication system's stations. Any of the following settings can be made: the telephone connections assigned to the respective door intercom buttons, the message to be played to callers, the intervals between messages, the period that elapses before the recorder begins functioning, date and time, or personal information.

The door answering system can also be connected to a telecommunications systems with several stations or telephone connections. In such cases only one central recording device is needed, although several may be used if required.

The following description, drawing and claims also indicate some of the other advantages of this invention and of its developments.

Drawing

The drawing shows a design example of the subject of this invention, described in greater detail below. It shows the following:

FIG. 1 shows a block diagram of an installation with door answering system, door intercom, recording device and telephone installation.

Description of the Design Example

FIG. 1 shows a block diagram with door answering system 1. The door answering system 1 is connected between the intercom 2 and telephone installation 3. The interfaces 4 and 5 at the door answering system are provided for this purpose. The answering machine 7 is connected via another interface 6. The door answering system is supplied with electricity via the door intercom 2.

Interface 4 is a multicore (5+n), while 5 and 6 are are two-wire interfaces:

Interface 4 multicore (5+n)

Interface 5 two-wire loop (as for terminal/telephone set) for calling target subscriber, spoken announcement, call interface for remote answering, a/b transfer, programming input Interface 6 two-wire connection (as for exchange/extension connection) with two-way calling, for recordings made by the central recording device when several connections are provided, programming input.

When the call button on the door intercom system 2 is pressed, the door answering system 1 recognizes the AC signal, initially stores the information, and immediately dials the appropriate connection. At the same time it plays a message to the caller, for example, "one moment please". If the line is clear, the connection is established with the door intercom. The caller then hears the call tone. If the call is not answered, the answering machine is activated by means of an interface. The caller then hears a message, for example, "That line is unavailable. You may, however, leave a message on our central information system. Please speak now." The information that is then recorded and details of the unsuccessful connection are stored. The person being called can listen to the information stored on the answering machine, either directly or using the remote calling mode.

If the person who is being called is initially unable to take the call, for example, if he or she is not present, the door answering system will nevertheless continue to dial the number.

All the features listed in the description, in the following claims, and in the drawing may be material to the invention, either individually or in any combination.

List of Reference Numbers

1. Door answering system
2. Door intercom
3. Telephone installation
4. Interface
5. Interface
6. Interface
7. Answering machine

What is claimed is:

1. An automatic door answering system for a facility comprising:
   (A) a door intercom system servicing the facility;
   (B) a recording machine located in the facility;
   (C) a telecommunication system located in the facility and including at least one telecommunication device;
   (D) a door answering unit, the door answering unit being provided in the form of a compact module (i) that is physically separate from the door intercom system and (ii) that is connected to the door intercom system, the recording machine, and the telecommunications system by way of first, second, and third dedicated multiwire interfaces connected to first, second, and third separate connection points on the door answering unit, respectively, the door answering unit including a microprocessor-based switching device, and the switching device switching connection of the door intercom system between the recording machine and the telecommunication system.

2. A method of automatically answering a door of a facility, the method comprising the steps of:
   (A) providing an automatic door answering system for the facility comprising a door intercom system, a recording machine, a telecommunication system located in the facility and including at least one telecommunication device, and a door answering unit, the door answering unit being provided in the form of a compact module (i) that is physically separate from the door intercom system and (ii) that is connected to the door intercom system, the recording machine, and the telecommunication system by way of first, second, and third dedicated multiwire interfaces connected to first, second, and third separate connection points on the door answering unit, respectively, the door answering unit including a microprocessor-based switching device, and the switching device switching connection of the door intercom system between the recording machine and the telecommunication system;
   (B) answering the door a first time upon the arrival of a first human visitor, including the steps of: 1) determining that the first visitor has activated the automatic door answering system, and
   (2) advising a human recipient that the first visitor has activated the door answering system, the human recipient being a recipient of the first visitor, including the steps of
      (a) coupling the door intercom system to the telecommunication system using the switching device, and
      (b) establishing a communication link between the first visitor and the recipient using the door intercom and the telecommunication system, the communication link enabling the first visitor to speak with the recipient, the door intercom establishing the portion of the communication link associated with the first visitor and the telecommunication system establishing the portion of the communication link associated with the recipient,
   (C) answering the door a second time upon the arrival of a second human visitor, including the steps of
      (1) determining that the second visitor has activated the automatic door answering system, and
      (2) advising the human recipient of the second visitor that the second visitor has activated the door answering system, the human recipient being a recipient of the second visitor, including the steps of
         (a) coupling the door intercom system to the recording machine using the switching device,
         (b) recording a message on the recording machine, the message being for the recipient from the second visitor,
         (c) coupling the recording machine to the telecommunication system using the switching device, and
         (d) playing the recorded message for the recipient.

3. A method according to claim 2, wherein the automatic door answering system is further provided with a speech recognition system, wherein the telecommunication system comprises a plurality of telephone connections assigned to a plurality of different human individuals, one of the plurality of different human individuals being the recipient, and wherein the step of establishing the communication link between the first visitor and the recipient further comprises the steps of:

requesting the first visitor to orally identify the recipient,
   determining the identity of the recipient by using the speech recognition system to interpret the oral identification of the recipient given by the first visitor,
   determining which one of the plurality of telephone connections is assigned to the recipient based upon the interpreted oral identification of the recipient,
   using the one of the plurality of telephone connections which is assigned to the recipient to establish the communication link.

4. A method according to claim 3, wherein the step of recording the message on the recording machine further comprises the step of recording a time at which the message is recorded.

5. A method according to claim 2, further comprising the step of playing a recorded message to the first and second human visitors using the recording machine.

6. A door answering unit comprising:
(A) a first interface, the first interface connecting a first connection point on the door answering unit to a door intercom system for a facility;
(B) a second interface, the second interface connecting a second connection point on the door answering unit to a recording machine located in the facility;
(C) a third interface, the third interface connecting a third connection point on the door answering unit to a telecommunication system located in the facility and including at least one telecommunication device, wherein the first, second, and third connection points are separate from one another; and
(D) a microprocessor-based switching device, the switching device switching connection of the door intercom system between the recording machine and the telecommunication system; and
wherein the door answering unit is provided as a separate module which is suitable for use in upgrading an existing door intercom system.

7. An automatic door answering system for a facility comprising:
(A) a door intercom system servicing the facility;
(B) a recording machine located in the facility;
(C) a telecommunication system and located in the facility including at least one telecommunication device;
(D) a door answering unit, the door answering unit being provided in the form of a compact module (i) that is physically separate from the door intercom system and (ii) that is connected to the door intercom system, the recording machine, and the telecommunication system, wherein the door answering unit is connected to the door intercom system and the telecommunication system by respective dedicated multiwire interfaces connected to first and separate connection points on the door answering unit without passing through the recording machine, the door answering unit including a microprocessor-based switching device, and the switching device switching connection of the door intercom system between the recording machine and the telecommunication system.

8. A method of automatically answering a door, the method comprising the steps of:
(A) providing an automatic door answering system comprising a door intercom system, a recording machine, a telecommunication system that includes a plurality of telephone connections assigned to a plurality of individuals, and a door answering unit, the door answering unit being provided in the form of a compact module that (i) includes a speech recognition system, (ii) is physically separate from the door intercom system and (iii) that is connected to the door intercom system, the recording machine, respectively; the door answering unit further including a microprocessor-based switching device, and the switching device switching connection of the door intercom system between the recording machine and the telecommunication system;
(B) answering the door a first time upon the arrival of a first human visitor, including the steps of:
(1) determining that the first visitor has activated the automatic door answering system, and
(2) advising a human recipient that the first visitor has activated the door answering system, the human recipient being a recipient of the first visitor, including the steps of
(a) coupling the door intercom system to the telecommunication system using the switching device, and
(b) establishing a communication link between the first visitor and the recipient using the door intercom and the telecommunication system, the communication link enabling the first visitor to speak with the recipient, the door intercom establishing the portion of the communication link associated with the first visitor and the telecommunication system establishing the portion of the communication link associated with the recipient, wherein the communication link is established by (i) determining the identity of the recipient by using the speech recognition system to interpret the oral identification of the recipient given by the first visitor, and (ii) determining which of the plurality of telephone connections is assigned to the recipient based upon the interpreted oral identification of the recipient; and
(C) answering the door a second time upon the arrival of a second human visitor, including the steps of
(1) determining that the second visitor has activated the automatic door answering system, and
(2) advising the human recipient of the second visitor that the second visitor has activated the door answering system, the human recipient being a recipient of the second visitor, including the steps of
(a) coupling the door intercom system to the recording machine using the switching device,
(b) recording a message on the recording machine, the message being for the recipient from the second visitor,
(c) coupling the recording machine to the telecommunication system using the switching device, and
(d) playing the recorded message for the recipient.

* * * * *